3,229,352
TEXTILE FIBRE DRAFTING ELEMENTS
Mark Balkin and Denys G. Turner, Newcastle upon Tyne, England, assignors to George Angus & Company Limited, Newcastle upon Tyne, England
Filed Mar. 4, 1963, Ser. No. 262,677
Claims priority, application Great Britain, Mar. 9, 1962, 9,130/62
1 Claim. (Cl. 29—132)

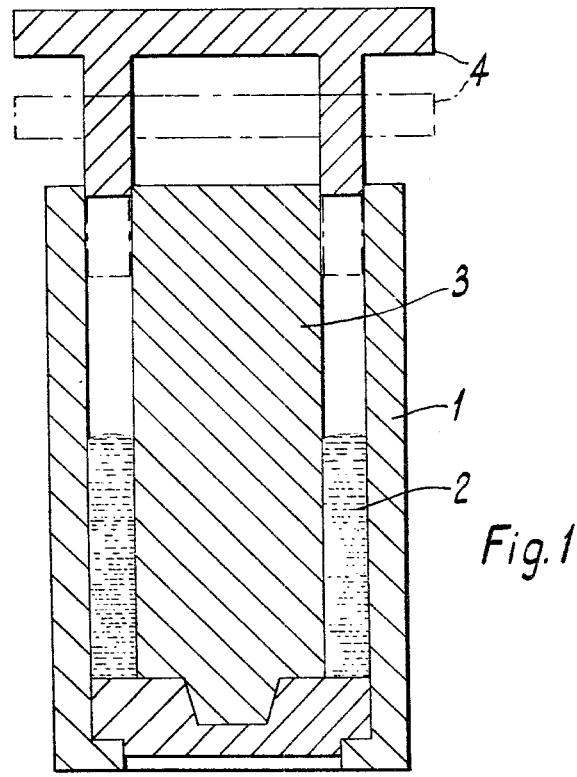
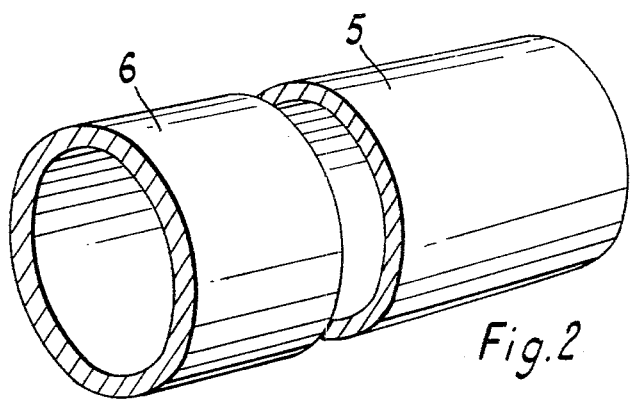

This invention relates to textile fibre drafting elements particularly roller covers, known also as cots, for high drafts, say 50 to 500, for which uniform compressibility of the cots has been found necessary to produce yarn of acceptable evenness and regularity.

In an effort to achieve the desired uniform compressibility, cots have been made from finely cellular oil-resistant synthetic rubber, particularly butadiene acrylic nitrile copolymer, and also granulated or powdered cork has been incorporated in a solid preparation of such a rubber with the additional object of providing a finely rough surface which assists the drafting action.

It is however very difficult to make accurately sized, uniformly compressible cots from materials such as those mentioned above or in general from any material which must be first prepared as a solid compounded mix and then moulded. Carefully controlled manufacturing methods have been found necessary to produce cots which have uniform compressibility under a given load applied at any radius. If the cots do not have such uniform compressibility, their nip point with coacting rollers during drafting fluctuates and this causes irregularities in the yarn.

A further difficulty encountered with cots in which granulated or powdered cork is incorporated is that cork particles at the surface of a cot become worn down or detached in use and the surface of the cot becomes polished or pitted with a consequent deterioration of its performance.

We have realised that many of the difficulties referred to above arise from the fact that the cots are moulded from a compounded or mixed material in a solid state. Also, any irregularity of distribution in the solid material of a blowing agent, in the case of a cellular rubber, or of a compressible component, such as cork, must result in the moulded product having a non-uniform compressibility as between one part and another thereof. Such irregularity of distribution is virtually inevitable in a preparation of solid materials and even if only slight can spoil the eventual quality of a cot for high drafts.

One feature of the present invention which avoids the above-mentioned difficulties is that a textile fiber drafting element is made, from an oil-resistant, micro-porous resilient material produced from a liquid preparation in which gas evolves, by a method including the steps of placing the liquid preparation in a mould to form the element and applying pressure to the mould to limit dilation of the material by gas evolved while the liquid preparation is setting to a solid state.

The invention has been devised using rubber-like resilient polyurethane materials which are polymeric materials obtained by interacting polyesters or polyethers and organic polyisocyanates with appropriate additions of other materials, in particular catalysts and water.

An important feature of the invention is therefore the use of polyurethane material but the possibility of not excluded of using other materials which can be produced from liquid preparations in which gas evolves and which have the properties of being resilient like rubber, microporous and oil-resistant as required for drafting elements.

By moulding under applied pressure from material in the liquid state, it is ensured that the consequences of the evolution of gas in the liquid material are uniformly distributed throughout the material and that a regularly micro-porous, and thus uniformly compressible, material is produced. Evolved gas is of course retained in the material while it is in the mould and, on removal from the mould after solidification or setting, the moulded product becomes distorted by expansion of the gas therein. Provided that the material is permeable however, like polyurethane, the gas escapes therefrom and the moulding eventually resumes its moulded shape.

Moulding under applied pressure as in the present invention should be distinguished from the known moulding of polyurethane foam products, as used for such purposes as upholstery and packing, in which a mould is charged with a relatively small quantity of material which expands freely to fill the mould.

Such expanded moulded foams have an apparent density of 0.025 to 0.400 g./cc. whereas elements in accordance with the present invention preferably have an apparent density of 0.400 to 0.900 g./cc., such a higher density material giving good results in terms of the grip obtained on the fibres during the drafting.

In addition to being uniformly compressible drafting roller coverings should rapidly recover from deformation resulting from prolonged idle contact against a fluted coacting roller and we have found that particularly good recovery properties are exhibited by polyurethane cots made in accordance with the invention from polyesters of polyethers as described in the examples given below.

An additional advantage of micro-porous polyurethane roller coverings made in accordance with the invention is that oil or grease from the fibres being drafted does not accumulate on the surface of the coverings and it appears therefore that the coverings are oil-repellent.

In the following examples of the production of cots for covering rollers for high draft purposes, certain materials are referred to by the trade names or trademarks under which they are commercially available as follows:

| | |
|---|---|
| Daltocel DA | A preparation of a liquid polyester resin, water and a catalyst, supplied by Imperial Chemical Industries Ltd. of London, England. |
| Suprasec DA | Liquid di-isocyanate, supplied by Imperial Chemical Industries Ltd. of London, England. |
| Desmophen 2000 | A linear polyester made up from ethylene glycol and adipic acid. |
| Desmodur 15 | Naphthalene 1.5 di-isocyanate. |
| Adiprene L.100 | A reaction product of polytetramethylene glycol and tolylene di-isocyanate. |
| MOCA | 4,4' - methylene - bis - (2-chloraniline). |
| Nitrosan | N,N' - dimethyl - N,N' - dinitroso terephthalamide. |

*Example 1*

193 gms. of Daltocel DA in a suitable container are thoroughly stirred by a mechanical stirrer and 87 gms. Suprasec DA added while continuing stirring. Intensive stirring is continued for about 45 seconds until the ingredients are thoroughly dispersed and the mixture is poured into a cylindrical steel mould of 3½" dia. A central cylindrical steel core of 2¾" dia. is quickly inserted and an annular steel plunger inserted into the annular space between the core and mould wall. Hydraulic pressure is then applied to the plunger to maintain the depth of the annular mould cavity at 6½" for 15 minutes while the contents set in the form of a tube. In this case the maximum pressure required is 1000 lbs. per square inch, and a stop is provided on the plunger to prevent over-compression. The mould and contents are then heated for 1 hour in an oven at 40° C., and then the tube removed from the mould. The moulded tube shows some distortion which disappears on standing overnight. The tube is sliced in 1″ widths which form the roller cots and are mounted on the spinning rollers in the usual way, the outer skin being removed by grinding. A permanently rough surface is left with very satisfactory drafting properties and the variation in compressibility around the circumference is well within the necessary very strict limits. The apparent density is 0.55 g./cc. approximately and the hardness approximately 50° IRHD. (International Rubber Hardness Degrees.)

*Example II*

260 gms. of Desmophen 2000 is heated to 135° C. for 2 hours in a suitable container under vacuum to remove traces of moisture. The vacuum is then removed and 44 gms. of Desmodur 15 added without further heating. The mixture is stirred slowly for about 10 minutes and 1.8 gms. water then injected below the surface with rapid stirring. After a further 15–20 seconds of rapid stirring the whole mixture is poured into the mould, as in Example I, and preheated to 110° C. The core and plunger are rapidly inserted and hydraulic pressure applied to maintain the depth of cavity at 6½″. The mould is maintained at 110° C. under pressure for 30 minutes and the tube then removed and baked for 8 hours at 110° C. The apparent density of the finished tube is 0.60 gms./cc. approximately and the hardness 62° IRHD approximately. Small amounts of other materials, the use of which is well known, may be added before the water, in order to improve pore size regularity, reduce moulding time, etc. if required.

240 gms. of Adiprene L100 are heated in a suitable container to 100° C. and maintained at this temperature while 12 gms. of finely diveded silica (e.g. Cab-O-Sil M5 supplied by Cabot Corporation of U.S.A.) and 2.5 gms. of silicone oil (e.g. DC.200 of 50 centistokes viscosity supplied by Dow Corning Corporation of U.S.A.) are stirred in. 29 gms. of Moca which has been previously heated until it just melts are added and stirred for 15–20 secs. 2.5 gms. of 50% Nitrosan dispersion are added and stirred thoroughly for 30–45 secs. The whole mixture is poured into the mould, as used in Example I, maintained at 100° C., the core and plunger are inserted and hydraulic pressure applied to maintain the depth of the cavity at 6½″. The pressure is maintained at 100° C. for 45 minutes after which the tube is removed and baked in an oven for 3 hours at 100° C. The apparent density of the finished tube is 0.57 gms./cc. approximately and hardness 55° IRHD approximately.

In the accompanying drawing:

FIG. 1 is an axial section of a mould as used in the above examples, and

FIG. 2 is a perspective view illustrating a tube produced in the mould and a slice cut therefrom to form a roller cot.

The drawing shows a cylindrical steel mould 1 in which the liquid preparation 2 has been poured and a core 3 inserted to define an annular cavity partly filled by the liquid 2 before evolution of gas causes expansion thereof.

An annular plunger 4 is inserted in the mould, as shown in full lines, and is thrust down by a hydraulic press (not shown) to a position, such as is indicated in broken lines, at which it limits expansion of the liquid during setting thereof.

A tube 5 removed from the mould and a slice 6 cut therefrom, to form a roller cot, are shown by FIG. 2.

Although the invention has been described as applied to roller covering cots, the possibility is not excluded of applying the invention to the production of other textile fibre drafting or contacting elements such as so-called drafting aprons which are small endless conveyor bands or belts which are led around rollers and form part of a well-known kind of drafting system. Such an apron may be provided with a surface layer of microporous polyurethane material produced in accordance with the present invention.

We claim:

A textile fibre drafting roller cot of resilient polyurethane moulded from a liquid preparation containing a member of the group comprising polyesters and polyethers as one component and an organic polyisocyanate as another component, the polyurethane having a uniformly compressible, regularly micro-porous structure resulting from limited dilation of said liquid preparation by evolution of gas therein during mouldng and the apparent density of the polyurethane being in the range 0.400 to 0.900 g/cc.

References Cited by the Examiner

UNITED STATES PATENTS

| | | | |
|---|---|---|---|
| 2,983,990 | 5/1961 | Stevenson et al. | 29—132 |
| 3,006,033 | 10/1961 | Knox | 264—55 |
| 3,056,168 | 10/1962 | Terry | 264—55 |
| 3,092,895 | 6/1963 | Balkin et al. | 29—132 |

WALTER A. SCHEEL, *Primary Examiner.*

JOSEPH D. BEIN, *Examiner.*